No. 647,800. Patented Apr. 17, 1900.
G. W. BROWN.
POULTRY FEEDING DEVICE.
(Application filed Oct. 13, 1899.)

(No Model.)

WITNESSES:
F. L. Ourand.
E. R. Bunyer.

INVENTOR:
George W. Brown.
BY
ATTORNEYS.

THE NORRIS PETERS CO., PHOTO-LITHO., WASHINGTON, D. C.

UNITED STATES PATENT OFFICE.

GEORGE W. BROWN, OF SUMMITVILLE, INDIANA.

POULTRY-FEEDING DEVICE.

SPECIFICATION forming part of Letters Patent No. 647,800, dated April 17, 1900.

Application filed October 13, 1899. Serial No. 733,519. (No model.)

*To all whom it may concern:*

Be it known that I, GEORGE W. BROWN, a citizen of the United States, residing at Summitville, in the county of Madison and State of Indiana, have invented new and useful Improvements in Poultry-Feeding Devices, of which the following is a specification.

My invention relates to improvements in feeding devices more especially intended for fowls or poultry.

It has for its object to provide for the advantageous and ready feeding of the fowls or poultry without wasting or scattering the food on the ground or about the yard and so as to give them the best care and attention, as also to greatly simplify construction, lessen cost of manufacture, and to otherwise improve the device.

It consists of the detailed construction of parts, including their combination and arrangement, substantially as hereinafter more fully described, and specifically pointed out in the claim.

It will be understood that changes as to the details herein disclosed may be made without departing from the spirit of my invention and the same yet remain intact and be protected.

Figure 1:
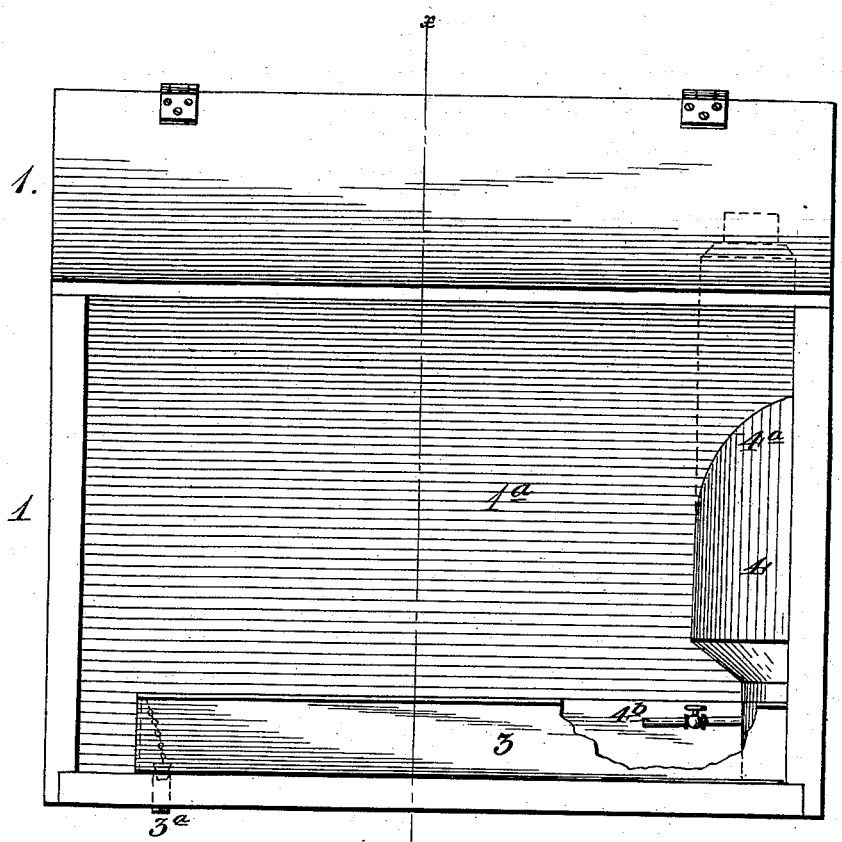
Figure 2:
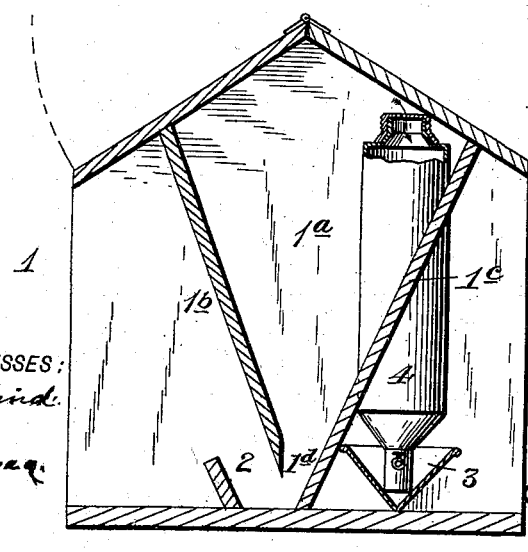

In the accompanying drawings, illustrating the preferred embodiment of my invention, Figure 1 is a side view of my invention. Fig. 2 is a cross-sectional elevation thereof.

In carrying out my invention I construct a closure or receptacle 1, suitably subdivided to provide therein a bin $1^a$ to contain or hold the grain or food for the fowls. This bin has two opposite downward and inward inclined walls $1^b$ $1^c$, one reaching clear down to the bottom of the receptacle. The other of these walls has its lower edge or end stopping a short distance from the bottom of the receptacle and disposed a suitable interval from the aforesaid wall, thus providing thereat a narrow opening or slot $1^d$, down through which the contents of the bin are fed. Just below the opening or slot of the bin is a trough 2, formed by a slightly outwardly and upwardly inclined board fixed upon said bottom, between the sides of the receptacle or closure, adapted to be supplied with grain or food from said bin for the feeding of the fowls or poultry. In the opposite side or compartment of the receptacle or closure is arranged, alongside of the inclined wall forming the back thereof, a trough or vessel 3 to hold or contain water for the fowls or poultry, it being preferably supplied with water by a tank or reservoir 4, suitably disposed with relation thereto. The tank or reservoir 4 is preferably secured in place by inserting it vertically through an opening $4^a$, produced in one edge or end of said inclined wall, said tank or reservoir being thus held against that side of the receptacle or closure. The lower end of the reservoir or tank is caused to enter the trough 3 and preferably secured thereto by solder or otherwise. It has a valved outlet-pipe $4^b$ to suitably supply water to the trough, the latter having a waste-water outlet $3^a$ at its opposite end extending preferably down through the bottom of the receptacle 1.

The receptacle or closure 1 has preferably a double-inclined roof or top, one inclined section thereof being hinged in place thereon, and thus adapted to form a lid or door for the bin 1 to permit access to the latter and to provide for replenishing its contents as desired.

By the arrangement disclosed both the water-trough and the feed-trough are located under shelter at opposite sides of the receptacle, their positions being such that the feed cannot be wasted by being thrown into the water-trough, and economy of space is attained by the vertical disposition of the water-tank and its location and arrangement relatively to the wall $1^c$.

Having thus fully described my invention, what I claim, and desire to secure by Letters Patent, is—

A feeding device consisting of a receptacle having downwardly-inclined partition-walls, one of which extends to near the floor of the receptacle to form an opening for the food, an inclined board secured to the floor of the receptacle and serving as one wall of a trough, the oppositely-inclined partition-wall forming the other wall of said trough, a water-receptacle passing through said latter wall, and a water-trough in a compartment in the receptacle opposite the feed-compartment, substantially as described.

In testimony whereof I have hereunto set my hand in presence of two subscribing witnesses.

GEORGE W. BROWN.

Witnesses:
LOTT. L. PAINTER,
JACOB L. CROUSE.